United States Patent [19]

Parker

[11] Patent Number: 4,459,387
[45] Date of Patent: Jul. 10, 1984

[54] CHLORINATION OF POLY(VINYL CHLORIDE) IN LIQUID CHLORINE, AND CHLORINATED POLY(VINYL CHLORIDE) COMPOSITION

[75] Inventor: Richard G. Parker, Hudson, Ohio

[73] Assignee: The B. F. Goodrich Company, Akron, Ohio

[21] Appl. No.: 418,813

[22] Filed: Sep. 16, 1982

Related U.S. Application Data

[63] Continuation-in-part of Ser. No. 228,538, Jan. 26, 1981, Pat. No. 4,350,798.

[51] Int. Cl.³ .................................................. C08F 8/22
[52] U.S. Cl. .............................. 525/331.6; 204/159.2; 525/356
[58] Field of Search ...................... 210/727; 525/331.6

[56] References Cited

U.S. PATENT DOCUMENTS 4,147,859 4/1979 Davis et al. ...................... 525/331.6
4,350,798 9/1982 Parker ................................. 525/356

Primary Examiner—Joseph L. Schofer
Assistant Examiner—Peter F. Kulkosky
Attorney, Agent, or Firm—James R. Lindsay; Alfred D. Lobo

[57] ABSTRACT

A process is disclosed for photochlorinating poly(vinyl chloride), ("PVC"), suspended in liquid chlorine ("$Cl_2$") which swells the PVC and permits chlorination to occur in a gel phase. PVC starting material is in the form of solid free-flowing macrogranules which are slurried in from about 5 to about 50 times their weight of liquid $Cl_2$ in a reaction zone maintained at a temperature in the range from about $-50°$ C. to about $50°$ C., and a pressure sufficient to maintain the chlorine in its liquid state. Since liquid $Cl_2$ itself swells the PVC to provide a gel phase in which photochlorination occurs, no conventional chlorinated hydrocarbon swelling agents, catalytic materials and the like are necessary. The process may be operated as a batch process, or a continuous process. Typical chlorine content of PVC is about 56.7 percent by weight (% by wt.), and the product of chlorination is chlorinated poly(vinyl chloride), ("CPVC"). When formed, this CPVC is dissolved in the liquid $Cl_2$ to form a thick syrup-like solution. CPVC is recovered as a solid by evaporation of the liquid $Cl_2$, or as a finely divided solid by adding a halogenated lower alkane slowly to the CPVC syrup. The solid CPVC is homogeneously chlorinated, and its morphology and spectra, especially its $^{13}C$ nmr spectra, differentiate it from prior art compositions.

8 Claims, 14 Drawing Figures

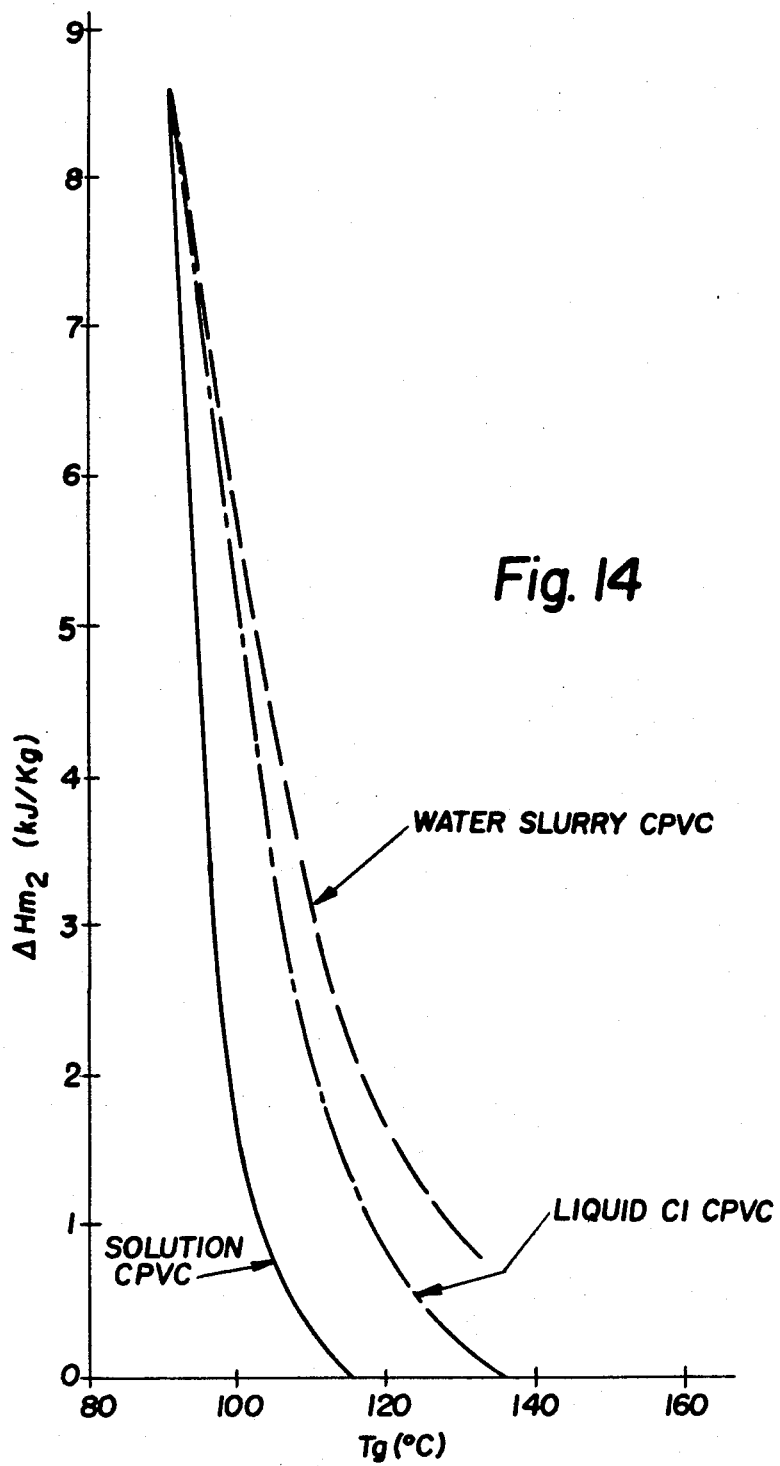

CHLORINATION OF POLY(VINYL CHLORIDE) IN LIQUID CHLORINE, AND CHLORINATED POLY(VINYL CHLORIDE) COMPOSITION

CROSS-REFERENCE TO RELATED APPLICATION

This is a continuation-in-part application of Ser. No. 228,538 filed Jan. 26, 1981 now issued as U.S. Pat. No. 4,350,798.

BACKGROUND OF THE INVENTION

The excellent heat distortion temperature of chlorinated poly(vinyl chloride) resins (hereinafter "CPVC" for brevity) predicates their use in applications where poly(vinyl chloride) resins (hereinafter "PVC" for brevity) would otherwise be chosen. CPVC resins are derived by chlorination of PVC, a reaction which has been studied in great detail over the past twenty years or so, during which numerous chlorination processes have been developed. Most preferred is a process carried out by suspending PVC in water, which PVC is swollen with a halogenated lower hydrocarbon swelling agent, and irradiating swollen PVC with ultraviolet light (actinic radiation) while bubbling chlorine gas ("$Cl_2$") into the water. This process is disclosed in U.S. Pat. No. 2,996,489 to Dannis, M. L. and Ramp, F. L. the disclosure of which is incorporated by reference herein as if fully set forth. Several subsequent inventions related to this basic process have been disclosed in the textbooks "Polyvinylchloride und Vinylchloride-Mischpolymerizate", pp 120–125, Springer, Berlin (1951); "Vinyl and Related Polymers," by C. A. Schildknecht (1952); and in U.S. Pat. Nos. 2,426,808; 2,590,651; 3,100,762; 3,334,077; 3,334,078; inter alia. The disadvantage of these liquid-phase processes in which the reaction occurs in an aqueous medium, is that (a) chlorine dissolves in water with difficulty, and even at elevated temperature and pressure, chlorinated product forms relatively slowly; and, (b) it is only with difficulty and expense that essentially all the swelling agent used in these processes can be removed from the CPVC product.

Other chlorination processes use reaction in an inert liquid medium (which liquid does not react with PVC), without a swelling agent, such as those disclosed in German Pat. No. 2,322,884 published Nov. 22, 1973; U.S. Pat. Nos. 3,506,637 and 3,534,013; inter alia.

Still other less preferred chlorination processes using an inert liquid medium comprise dissolving or suspending the resin in a chlorinated hydrocarbon solvent and promoting the reaction with heat, light, or a catalyst. Yet other processes utilize a fluidized bed of PVC which is contacted with $Cl_2$ gas, optionally diluted with an inert gas, and optionally also containing a lower chlorinated hydrocarbon, again catalyzed by ultraviolet radiation. Such processes have been disclosed in U.S. Pat. Nos. 3,532,612; 3,663,392; 3,813,370; Japanese Pat. No. 49-45310; British Patent Specification Nos. 1,089,323; 1,242,158; 1,318,078; and, German Pat. Nos. 1,110,873; 1,259,573; inter alia. These fluidized bed chlorination processes occur in a gaseous reaction medium, but with difficulty, because of the slow gaseous diffusion of $Cl_2$ into solid PVC macrogranules. The term "macrogranules" is used herein to define a cluster or aggregate of randomly closely packed primary particles of suspension PVC. A handful of macrogranules has the feel of fine sand, and are also referred to as "grains". A macrogranule of suspension PVC or CPVC will typically have an average diameter of from about 100 to about 150 microns, A preferred size distribution of each macrogranule is in the range from about 50 to about 500 microns, and conventionally ranges from about 100 to about 200 microns. Each macrogranule is made up of a multiplicity of primary particles each in the size range from about 0.05 micron to about 5 microns, and more typically in the range from about 0.5 micron (5000 A) to about 2 microns (20,000 A). The bulk of the primary particles are usually submicronic in size, though conditions of polymerization will determine the actual size distribution of both primary particles, and also, macrogranules. Macrogranules can be characterized by their porosity, that is, internal pore volume, and surface area.

The morphology of PVC and CPVC macrogranules, specifically the porosity and surface area, are important properties which determine the physical properties of an article after the polymer is molded. Since CPVC is generally derived by the chlorination of PVC, it has been found that the properties of product CPVC may be tailored to a large extent by precisely controlling the conditions under which precursor PVC is polymerized. Such a process is disclosed in U.S. Pat. Nos. 3,506,637 and 3,534,103. With care, the internal morphology of PVC macrogranules may be particularly tailored to permit relatively fast chlorination in a fluidized bed process catalyzed by actinic radiation. Even so, it is necessary for economy, to practice the process in two stages, as disclosed in U.S. Pat. No. 4,039,732 to Stamicarbon B. V.

I am aware that it is known to chlorinate solid crystalline polyethylene ("PE") by reacting between 5 to 100 parts of liquid $Cl_2$ per part of PE, in a reaction medium of liquid $Cl_2$, until the resulting chlorinated PE (hereinafter "CPE" for brevity) dissolves in the liquid $Cl_2$, and then to recover CPE by evaporating the $Cl_2$. This process is described in greater detail in Canadian Pat. No. 471,037 to John L. Ludlow which teaches a process for the chlorination of ethylene polymers. In this process, PE is suspended in at least 5 parts liquid $Cl_2$ and irradiated with a suitable light source. As taught by Ludlow, the chlorination of PE which is crystalline and has no chlorine bound in its structure, proceeds from the surface inwardly, the chlorinated polymer dissolving in the chlorine substantially immediately upon its formation, thereby exposing unchlorinated polymer. The PE is not homogeneously chlorinated.

Quite surprisingly, however, the chlorination of PVC in liquid $Cl_2$ results in the substantially homogeneous chlorination of the PVC. By "homogeneous chlorination" I mean the chlorination of PVC so that when the Cl content of the CPVC formed is at least 65% by wt, the ratio of residual mols of PVC present as a block or run (sequence) of at least 3 vinyl chloride ("VC") units, to the mols of total VC units is less than 0.30. This may be stated as follows:

$$\text{Homogeneous CPVC} = \frac{\text{mols PVC as sequences}}{\text{mols of total VC units}} < 0.30$$

Homogeneity of CPVC having a Cl content of at least 65% by wt uniquely characterizes the CPVC produced by the process of this invention. This homogeneity is attributed to the presence of Cl throughout the PVC polymer. The presence of Cl on the backbone allows the PVC to swell in liquid $Cl_2$ sufficiently to form a gel phase which allows rapid reaction. In other words, $Cl_2$ produces a gel phase in the PVC, swelling it without producing a solution of PVC in $Cl_2$. Thus, CPVC produced in my invention is a G-product quite distinct from CPVC resins prepared in solution ("solution chlorinated") and referred to as L-product (see "Encyclopedia of PVC" edited by Leonard I. Ness, Chapter 6 "Chemically Modified Polyvinyl Chloride", p 229). PE is not chlorinated by a gel type chlorination. Though PE and PVC may each be chlorinated in liquid chlorine, many polymers of monoolefinically unsaturated monomers are not chlorinated in liquid $Cl_2$, or only slightly chlorinated. For example, poly(vinyl fluoride), and poly(vinylidene chloride-vinyl chloride, 88:12) are not chlorinated; and, as Ludlow taught, unless PE is suspended in at least 5 parts by weight liquid $Cl_2$, there is very little chlorination.

In my copending patent application Ser. No. 177,969 filed Aug. 14, 1980, there is disclosed a process for the relatively dry chlorination of PVC macrogranules in which only sufficient liquid $Cl_2$ is used as will "wet" the macrogranules without any visual appearance of having been "wetted". The terms "wet" and "wetted" are used therein to refer solely to the presence of liquid $Cl_2$ on macrogranules of polymer, and not to the presence of water. When the requisite amount of liquid $Cl_2$ within a narrowly specified range is absorbed by the solid PVC which is then irradiated with actinic (ultraviolet) radiation, there results a reaction in the solid PVC medium which produces a CPVC product which is distinguishable over prior art CPVC products formed by prior art methods. In this "relatively dry chlorination of PVC" the reaction proceeds in a solid medium, the liquid $Cl_2$ having diffused into the solid PVC without affecting its free-flowing nature.

I am unaware of any process for the chlorination of PVC macrogranules by a reaction which occurs in a gel phase in a suspension of PVC in liquid $Cl_2$. It is the peculiar characteristic of such a reaction which results in the substantially homogeneous chlorination of PVC.

It is reported to be possible to obtain "uniform chlorination" of PVC in water (see Takadono, Yoshido and Fukawa in Kogyo Kagaku Zasshi, Vol 67, No. 11, 1928 (1964); C. A. 62, 13262h), but this requires the assumption that $Cl_2$ is a solvent for PVC and that $Cl_2$ will thus enter even the most crystalline regions (see "Encyclopedia of PVC" supra, p 228). A homogeneously chlorinated PVC prepared in a suspension of PVC in hydrochloric acid is also reported by Seidel, Singer and Springer in Ger.(East) Pat. No. 32586; (C.A. 63, 7130f). In each case, the light-catalyzed reaction was of extremely long duration, about 8 hours. Since my reaction proceeds very rapidly despite being a gel type chlorination, it is clearly a distinctly different process.

It should also be noted that in U.S. Pat. No. 2,996,489 it is stated that the CPVC made therein has "a structure in which at least 75%, more preferably at least 95%, and most preferably essentially all (i.e. 97-98%) of the chlorinated vinyl chloride units are 1,2-dichloroethylene units. Such products are thus distinguished over prior art CPVC resins which contain a significantly higher proportion (i.e. greater than 10%) of the chlorinated vinyl chloride units as the undesirable 1,1-dichloroethylene units" (see top of col 2). This statement was based on chemical analysis of the CPVC prepared by using chloroform and other hydrochoromethylene compounds as swelling agents in the '489 process. At that time, pulsed Fourier transform $^{13}C$ nuclear magnetic resonance ("Cnmr" for brevity) spectra were not available, and the details of the structure of CPVC revealed through analysis of the spectra were not known. The Cnmr spectra presented herewith provide an insight into the structure of prior art materials as well as those prepared by the high liquid chlorination process of this invention. Comparison of these spectra graphically highlights their simlarities and differences. Analyses of the spectra are based on studies such as those described in "Determination of Tetrad Concentration in Poly(vinyl chloride) Using Carbon-13 Nuclear Magnetic Resonance Spectroscopy" by Carman, Charles J., in "macromolecules", Vol 6, pg 725 et seq, September–October 1973.

SUMMARY OF THE INVENTION

It has been discovered that solid, discrete, macrogranules of poly(vinyl chloride), "PVC" for brevity, when slurried in at least 5 times their weight of liquid chlorine ("$Cl_2$"), absorb the liquid so as to swell the PVC sufficiently to produce a gel phase which allows the PVC to be homogeneously chlorinated. Upon chlorination of the slurry in the presence of actinic (ultraviolet) radiation, a gel-type reaction occurs in the gel phase, within and around swollen macrogranules. This reaction occurs at a temperature in the range from about $-50°$ C. to about $50°$ C. and a pressure sufficient to maintain the $Cl_2$ in the liquid phase, and unexpectedly produces the homogeneously chlorinated 'chlorinated poly(vinyl chloride)', "CPVC" for brevity, having a Cl content of at least 65% by wt, in which the mol ratio of PVC present in a sequence of 3 or more vinyl chloride ("VC") units, to the mols of total VC units, is always less than 0.30.

It has also been discovered that because of the swelling of the PVC which produces a gel phase prior to commencement of the chlorination reaction in the presence of ultraviolet light, the sites of the replaceable hydrogen atoms in both the amorphous and crystalline regions of the PVC are essentially randomly chlorinated to yield a novel CPVC composition. Unexpectedly, the product CPVC formed by this "high liquid chlorine" process is readily distinguishable over prior art CPVC compositions, particularly by $^{13}C$ nuclear magnetic resonance ("Cnmr") analysis. In this homogeneously chlorinated composition, the tacticity ratio in the CPVC is substantially the same as the tacticity ratio of the PVC from which it was derived. A comparison of thermal data for the novel CPVC composition with thermal data for prior art CPVC compositions, each with the same Cl content, also clearly distinguishes the one from the others.

It is therefore a general object of this invention to provide a process for the photochlorination of solid porous macrogranules of PVC, having a Cl content in the range from about 55 to about 57% by wt, suspended in an excess of liquid $Cl_2$, to produce a homogeneously chlorinated CPVC product with a Cl content of at least 65%. Since chlorine provides the dual function of reactant and swelling agent, the use of conventional swelling agents, or other reaction aids whether catalytic or not, is avoided. Also avoided is the difficult problem of removing such aids from the CPVC product.

It has still further been discovered that the "high liquid chlorination" gel-phase photochlorination process of this invention is readily adaptable to a continuous process in which macrogranules of PVC are slurried in at least 5 times their weight of liquid $Cl_2$ near one end of a reaction zone maintained at a temperature in the range from about −50° C. to about 50° C., for a period of time sufficient to cause their swelling, and agitated in the reaction zone while being exposed to actinic radiation. After a period of time sufficient to convert the PVC into CPVC containing a predetermined amount of chemically-bound Cl in the CPVC, a solution of homogeneously chlorinated CPVC in liquid $Cl_2$ may be continuously recovered from near the other end of the reaction zone. The amount of Cl in the range from 65% to about 73% by wt, which replaces replaceable H atoms in the PVC may be controlled by adjusting the process conditions under which the chlorination takes place, but cannot be exceeded by the process of this invention. By-product hydrogen chloride (HCl) gas formed during the reaction is removed from the reaction zone; and concurrently evolved $Cl_2$ gas is optionally condensed and recycled as liquid $Cl_2$ to the reaction zone.

It is therefore a general object of this invention to provide a process for the continuous photochlorination of a mass of PVC macrogranules slurried in from about 5 to about 50 times their weight of liquid $Cl_2$ for a sufficient period of time prior to photochlorination, so as to allow absorption of the $Cl_2$ into the macrogranules, and their swelling to provide a gel phase within and around each macrogranule. Upon chlorination in the presence of ultraviolet radiation some or all of the $Cl_2$ evolved during reaction, may be returned to the reaction zone as liquid.

Yet another discovery is that the CPVC formed may be recovered from its solution in liquid $Cl_2$ by adding to the solution a solvent for $Cl_2$, in which solvent CPVC is essentially insoluble, so as to form a three-component mixture, and then recovering solid CPVC from the three-component mixture.

It is therefore a specific object of this invention to provide a simple and effective process for recovering solid porous CPVC from a mixture of CPVC dissolved in $Cl_2$ by adding a halogenated lower alkane ("HLA") to dissolve the $Cl_2$ to form a three-component mixture from which CPVC may be recovered as a solid base.

BRIEF DESCRIPTION OF THE DRAWINGS

The invention will be more readily understood from the following detailed description of the process and the composition produced from it, taken in conjunction with schematic illustrations of the process, Cnmr spectra and photomicrographs of the PVC starting material and chlorinated products derived from them, set forth in the accompanying drawings, wherein:

FIG. 14 is a plot of the second heat of melting ($\Delta Hm_2$) of each of the three CPVCs identified in FIG. 13, as a function of their glass transition temperatures.
*Geon is a Registered Trademark of The B. F. Goodrich Company.

DETAILED DESCRIPTION OF THE INVENTION

The high liquid chlorination process of this invention is not only unexpectedly efficient, but it also produces, directly, a CPVC composition which is distinguishable from prior art compositions. The efficiency of this process is attributable to the high concentration of $Cl_2$ molecules and their swelling effect on PVC particles which produces a gel phase and permits Cl addition to both amorphous and crystalline regions of the PVC with equal probability so that a homogeneously chlorinated polymer is obtained. Though PVC is known to be photochlorinated in a gel phase produced by swelling the PVC with certain chlorohydrocarbons, it was not expected that a photochlorinatable gel phase would be obtained when PVC is suspended in liquid $Cl_2$, nor that such a gel phase in liquid $Cl_2$ would yield homogeneously chlorinated CPVC.

Figure 7:
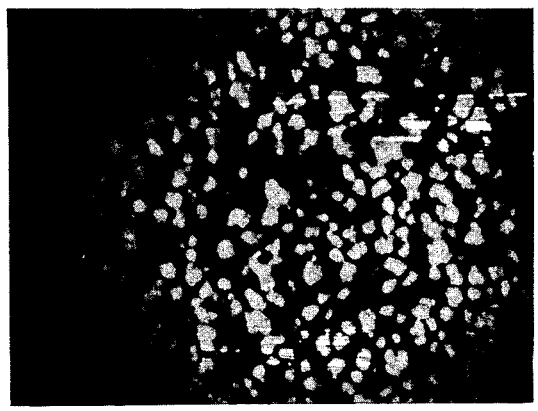
FIG. 7 is a photomicrograph, at 20× magnification, of a typical mass of discrete macrogranules of Geon 110×352 PVC.
Figure 8:
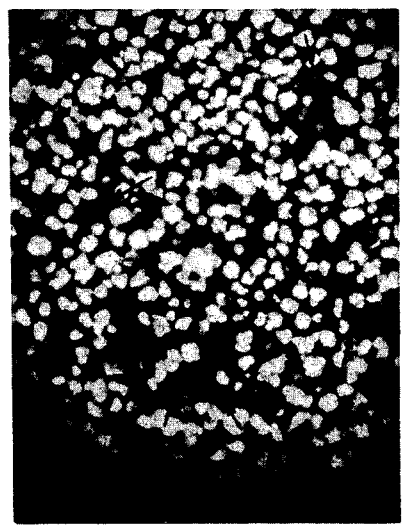
FIG. 8 is a photomicrograph, at 20× magnification, of chlorinated Geon 110×352 PVC after it has been soaked in liquid $Cl_2$ so as to swell and form a gel phase, after which the $Cl_2$ is removed.

FIGS. 7 and 8 are photographs, each at 20× magnification, of a typical commercial PVC homopolymer such as Geon® 110×352 before (FIG. 7) and after (FIG. 8) it is soaked in liquid chlorine and then dried. In FIG. 7, all macrogranules have a milk-white appearance. In FIG. 8 the arrows point to some of the macrogranules which have a distinctly translucent appearance due to the formation of a gel phase. All macrogranules in FIG. 8 are generally the same size as the original PVC macrogranules in FIG. 7 because, upon drying after soaking, they have reverted to their original size because the liquid $Cl_2$ is removed. As long as the macrogranules contain liquid $Cl_2$ they are swollen. Other macrogranules which appear milk-white in FIG. 8 also include a gel phase which is formed in varying degrees of completeness not sufficient to be seen in this photograph.

In the process of this invention, the PVC starting material must have three essential characteristics, namely, (1) a high molecular weight; (2) a macrogranular form; and (3) adequate purity and freedom from contamination and degradation. These and other characteristics of the PVC starting material are disclosed in greater detail in U.S. Pat. No. 2,996,489 the disclosure of which is incorporated by reference herein as if fully set forth.

The process of this invention is peculiarly adapted to the photochlorination of vinyl chloride homopolymer having a Cl content in the range from about 55% to about 57% by wt despite its crystallinity, and also because of the peculiar particle morphology of these PVC macrogranules. In the most preferred embodiment of this invention, the process is used for chlorinating solid macrogranules of homopolymers of vinyl chloride, prepared by emulsion, suspension, solution or bulk polymerization techniques to yield a polymer having a relatively high molecular weight in the range from about 100,000 to about 1,000,000. Most preferred are porous macrogranules of PVC produced in an aqueous suspension. The molecular weight of PVC may be related to its specific viscosity which is determined in a known manner. The PVC starting material in the process of this invention has a high molecular weight such that it possesses a specific viscosity of at least 0.20.

The photochlorination process of this invention is carried out at a temperature below the condensation point of $Cl_2$ as it is critical that the $Cl_2$ absorbed within the macrogranules of PVC be present in the liquid state, under the pressure conditions of the reaction. It is more preferred that the temperature of reaction be substantially below the condensation point of $Cl_2$ at the pressure at which the reaction is to be carried out. This preferred temperature of reaction is in the range from about $-50°$ C. to about $50°$ C., though a temperature as high as $70°$ C. is operable. At atmospheric pressure this temperature of reaction is preferably in the range from about $-50°$ C. to about $-40°$ C., though lower temperatures as low as about $-80°$ C. may be employed. At 100 psig, the reaction temperature is about $25°$ C., and even higher pressures and correspondingly high temperatures may be used. However, above about 100 psig the benefits due to better diffusivity of liquid $Cl_2$ into the macrogranules of PVC begin to be vitiated by the economic penalties of operating at the higher pressures.

Liquid chlorine is absorbed into macrogranules of PVC by pumping the liquid into a mass of granules which is being mildly agitated so as to present fresh macrogranule surfaces to the liquid which is quickly absorbed into the macrogranules thus coming into contact with the primary particles which constitute a macrogranule. By the term "absorbed" I refer to liquid chlorine held within a macrogranule, irrespective of whether the precise mechanism of holding the chlorine entails absorption, adsorption, chemisorption or physiosorption. The amount of liquid chlorine pumped on to the mass of PVC to be chlorinated is in the range from about 5 parts to about 50 parts by weight chlorine per part by weight of PVC. In this range, and in the more preferred range of from about 5 to about 30 parts by weight liquid $Cl_2$ per part by weight of PVC, the mass appears to be a freely pumpable liquid slurry. Calculations indicate that 1.13 parts by weight liquid $Cl_2$ per part of PVC is sufficient to yield, theoretically, a CPVC with a chemically bound Cl content of 73.1%; but, unless a large excess of $Cl_2$ at least 5 times as much by weight as the amount of PVC is used, the PVC will not be homogeneously chlorinated. The precise amount of Cl actually introduced into the polymer after the chlorination reaction is completed will further depend upon the time of the reaction, the intensity of the ultraviolet radiation, and the physical and chemical characteristics of the PVC starting material. It will be evident that the physical and chemical characteristics of the CPVC product will vary according to the process conditions under which it was formed, and that a particular CPVC product may be obtained by routine and simple trial and error to stabilize all the variables.

Since liquid $Cl_2$ itself is the critical swelling agent, no additional swelling agents are either necessary or desirable in the process of this invention, so that upon photochlorination, only hydrogen chloride (HCl) trapped in the macrogranules, and liquid $Cl_2$ not consumed in the reaction are to be removed. Because the chlorination reaction is exothermic, the temperature of the reaction mass will tend to rise. Some $Cl_2$ may be evolved along with byproduct HCl, and evaporation of the $Cl_2$ tends to allow the reaction to proceed substantially isothermally. In general, additional cooling may be required to maintain the desired temperature of the mass of PVC macrogranules. Both HCl and evaporated $Cl_2$ are conveniently removed as gas, and $Cl_2$ may be condensed and recycled to the reaction, if desired, as is explained in greater detail herebelow.

Any form of actinic radiation is suitable; for example, ordinary incandescent lamps, mercury vapor or arc lamps, neon glow tubes, fluorescent tubes, carbon arcs and sodium vapor lamps may be employed. Ultra-violet light is the preferred source of illumination. In order to obtain a highly heat-stable chlorinated resin when the chlorination is stimulated by photoillumination, the intensity of illumination is desirably controlled to avoid surges in temperature.

The CPVC product formed by the high liquid $Cl_2$ process of this invention is distinguishable from prior art CPVC not only by its spectral "fingerprint", but also by its physical characteristics, particularly its appearance. A visual examination of the CPVC product under 20× magnification shows that the majority of particles appear milky white but, irrespective of how the CPVC is recovered from its solution in liquid $Cl_2$, quite dissimilar to the PVC macrogranules from which the CPVC was derived. A more detailed comparison shows the difference in internal structure, and in particular, for CPVC recovered with a HLA solvent for chlorine, a distinctly different particle morphology.

Figure 9:
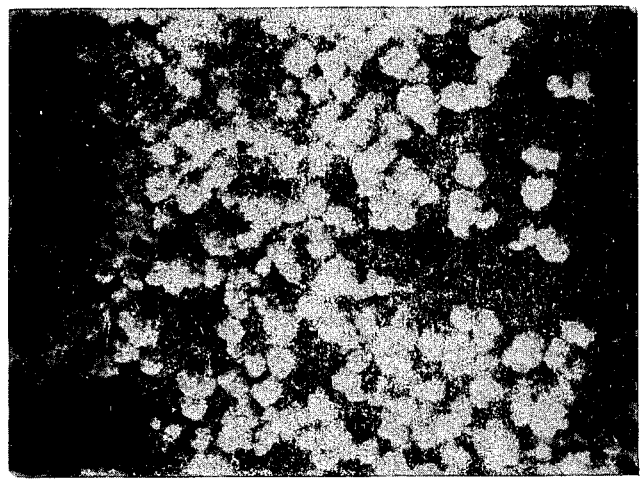
FIG. 9 is a photograph, at 30× magnification, of Geon 103EP PVC resin.
Figure 10:
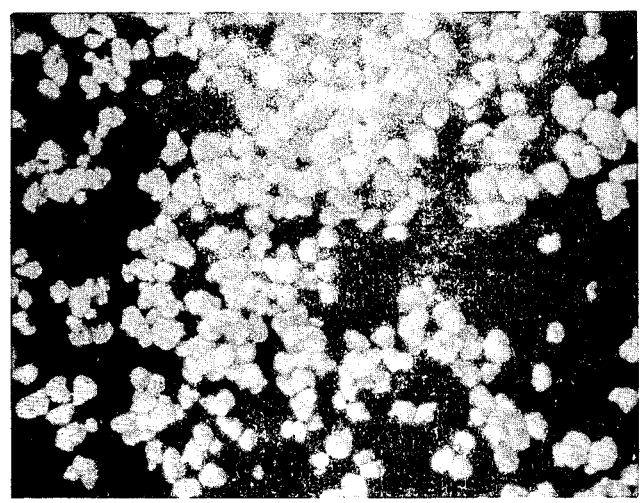
FIG. 10 is a photograph, at 30× magnification, of Geon 603×560 CPVC resin obtained by chlorination of an aqueous suspension of 103EP PVC shown in FIG. 9.
Figure 11:
FIG. 11 is a photograph, at 30× magnification, of homogeneously chlorinated CPVC resin made by chlorination in liquid $Cl_2$ and recovered by precipitation of the solid from its solution in liquid $Cl_2$ by the addition of a solvent for $Cl_2$, showing the characteristic non-spheroidal powdery form of CPVC obtained.

FIG. 9 is a photograph, at 30× magnification of a sample of commercial Geon® 103EP PVC resin. FIG. 10 is a photograph, also at 30× magnification, of a sample of commercial Geon® 603×560 CPVC resin which is made by the chlorination of an aqueous suspension of the 103EP resin. FIG. 11 is a photograph, also at 30× magnification, of a sample of powdery homogeneously chlorinated CPVC recovered by precipitation with an HLA according to the process of this invention. It is seen that the particles of the powdery CPVC do not have the typical generally spheroidal form of the macrogranules shown in FIGS. 9 and 10, but are of non-uniform shape, and most of the particles are agglomerated. Even as agglomerates the particles in FIG. 11 have a distinctly translucent appearance quite different from the appearance of the macrogranules of CPVC in FIG. 10. Other morphological differences are not apparent in these photographs.

The surface area and other physical properties of the CPVC obtained will depend upon the conditions of chlorination, the particular characteristics of the starting PVC resin, the Cl content of the CPVC, the method by which the CPVC is recovered from its solution in $Cl_2$ and other factors. Surface area is measured by the BET method using nitrogen adsorption, as more fully described by Brunauer, Emmett and Teller in J.A.C.S. 60, 309–319, (1938).

When compared at the same weight percent chlorine, all CPVCs have essentially the same set of $^{13}C$ nmr chemical shifts. An easily observed feature of these spectra is the appearance of particular chemical shifts originating from sequences of unchlorinated PVC. Typically, a CPVC produced by the aqueous chlorination method, containing 69% by wt Cl contains about 10–25% sequences of at least three unchlorinated VC units. In contrast, CPVC prepared by the high liquid chlorination process of this invention, and also containing 69% by wt chlorine, contains essentially no detected sequences of three or more units of unchlorinated VC, that is, the CPVC of this invention is homogeneously chlorinated. In addition, it can be shown that the CPVC prepared by the aqueous process contains a much different distribution of tacticities compared with that of CPVC prepared by this high liquid $Cl_2$ process. For example, at 65% by wt Cl content, there are less than 10 mol% PVC sequences but the CPVC is nevertheless homogeneous. Also, as is described in greater detail hereinafter, the distribution of syndiotactic, heterotactic and isotactic peaks for desirable CPVC prepared by this high liquid $Cl_2$ process uniquely characterizes this material and identifies the process by which it is prepared.

Figure 1:
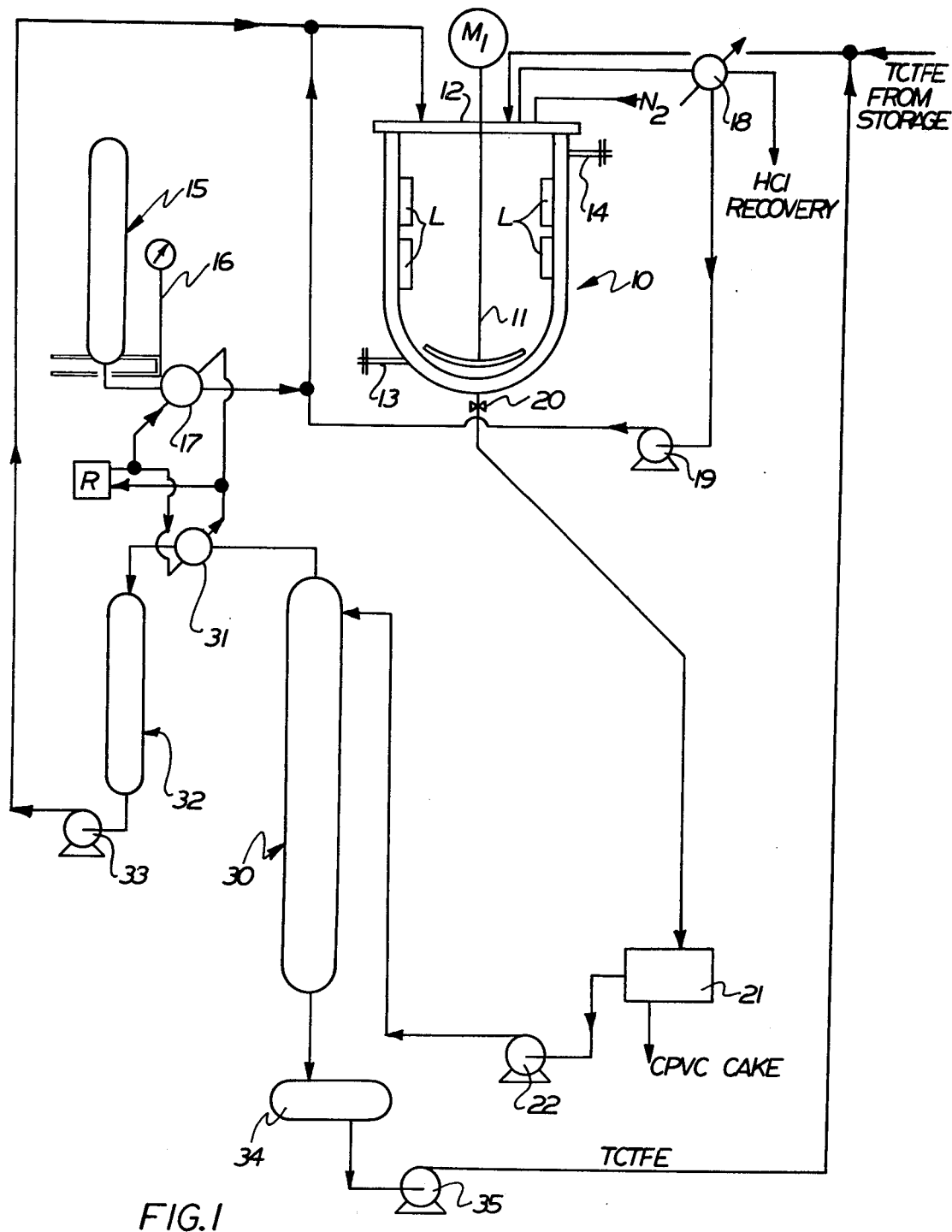
FIG. 1 is a flowsheet schematically illustrating the principal features of a batch process for the chlorination of a wet slurry of PVC macrogranules slurried in at least 5 times their weight of liquid chlorine.

Referring now to FIG. 1 there is schematically illustrated a jacketed reactor 10 made of suitable corrosion resistant material such as Hastalloy, designed to be operated at elevated pressure sufficient to ensure that liquid chlorine in the reactor is maintained in a liquid phase. The reactor 10 is equipped with ultraviolet lamps, identified by reference symbol L, of suitable intensify sufficient to photoilluminate solid porous macrogranules of PVC suspended in the liquid $Cl_2$ so as to cause the PVC to react with the $Cl_2$ and form CPVC which is dissolved in the liquid $Cl_2$. The reactor 10 is also equipped with a paddle-type stirrer 11 driven by an electric motor $M_1$ which keeps the suspension of PVC in liquid $Cl_2$ thoroughly agitated. In addition, the reactor is equipped with nozzles (not specifically identified) in its cover 12, to permit flushing it with an inert gas such as nitrogen when desired, and to carry off gaseous HCl generated during the chlorination reaction in which HCl some $Cl_2$ may be entrained. Nozzles 13 and 14 allow a low temperature heat exchange fluid ("cryogen") to be introduced into, and discharged from, the jacket of the reactor so as to maintain its contents at any preselected temperature at the pressure chosen for its operation.

Liquid $Cl_2$ is charged to the reactor from a first $Cl_2$ cylinder 15 on a weigh scale 16, the amount of $Cl_2$ charged depending mainly upon the amount of solid PVC to be batch-chlorinated in the reactor. Since a more preferred temperature for chlorination is in the range from about $-30°$ C. to about 25° C., and still more preferably in the range from about $-10°$ C. to about 15° C., it is generally desirable to cool the $Cl_2$ drawn from the cylinder 15 in a heat exchanger 17 through which a cryogen from a refrigeration system R is circulated. After a period of time during which liquid $Cl_2$ is absorbed into the PVC macrogranules and swells them, ultraviolet lamps L in the reactor are turned on. Agitation is continued until the desired degree of chlorination is achieved, that is, a preselected level of $Cl_2$ is introduced into the PVC. This level is determined by simple trial and error. The amount of $Cl_2$ vapor entrained with HCl evolved during reaction depends upon the process conditions chosen, particularly the pressure and temperature under which the reactor is operated. Where the entrainment of $Cl_2$ is significant, it is desirable to condense the $Cl_2$ vapors in a heat exchanger 18 through which cryogen from the refrigeration system R is circulated (connecting lines to R are not shown). The HCl vapors from the exchanger 18 are led to a HCl recovery system in which they are used as a reactant for another process. Liquid $Cl_2$ from exchanger 18 is returned by pump 19 to the reactor 10, to be reused.

Typically, the chlorination reaction is carried out batch-wise by charging a mass of macrogranules of PVC to the reactor, and commencing agitation to lower the temperature to about $-10°$ C. which is slightly higher than the temperature of the cooling fluid circulated through the reactor's jacket. A predetermined weight of liquid $Cl_2$ at about $-10°$ C. is then slowly pumped onto the churning mass of PVC macrogranules until the liquid $Cl_2$ having been absorbed by the mass of PVC macrogranules, floods them with an excess. The lamps L are then switched on and agitation continued. No catalyst other than the u-v light is either desirable or necessary. The progress of the reaction may be monitored by noting the amount and rate at which HCl is evolved from the reaction zone of the reactor. When the reaction is essentially complete, as indicated by no further evolution of HCl, the agitation is stopped, and the CPVC formed is recovered. Runs at room temperature and corresponding pressure of about 100 psig are made in an analogous manner.

The contents of the reactor after chlorination is completed are generally syrupy, the consistency of the syrup depending primarily upon the ratio of liquid $Cl_2$ to PVC. The CPVC may be recovered from the syrup in any convenient manner. For example, the syrup may be thinned with tetrachloroethane (TCE), the $Cl_2$ driven from the thinned syrup, and the CPVC precipitated from its solution in TCE by concentration. A far more economical, novel and highly effective method is to thin the syrup with a HLA in an amount sufficient to precipitate the CPVC.

For acceptable operation of the process of this invention, any HLA may be used provided, under operating conditions, (i) liquid $Cl_2$ is substantially completely soluble in the HLA, and (ii) CPVC is essentially insoluble in the HLA. By 'substantially completely soluble' I mean a solubility of at least 20 parts of liquid $Cl_2$ per 100 parts of HLA, and by 'essentially insoluble' I mean a solubility of less than about 100 parts per million (ppm).

A preferred HLA is chosen from among the chlorinated and/or fluorinated derivatives of a lower alkane having from 1 to about 6 carbon atoms, and more preferably from chlorinated and fluorinated derivatives of methane and ethane, and particularly monochlorodifluoromethane, monochloropentafluoroethane, dichlorodifluoromethane ("DCDFM"), 1,1-chlorodifluoro-2,2-chlorodifluoroethane, dichlorofluoromethane, tetrachlorofluoromethane, 1,1-bromodifluoro-2,2-bromodifluoroethane, 1,1,1-chlorodifluoro-2,2,2-dichlorofluoromethane ("TCTFE"), and 1,1,1-chlorodifluoro-2,2-dichlorofluoroethane, commercially available as Freon ® brand fluorocarbons from the E. I. duPont de Nemours Co. More preferred are those fluorocarbons having a boiling point in the range from about −30° C. to about 48° C., the particular fluorocarbon chosen depending upon its availability at reasonable cost, and the process conditions deemed most economical for its ability to dissolve liquid $Cl_2$ and be freed from it.

Soon after TCTFE is added to the reactor, the syrup becomes less viscous because of the essentially immediate dissolution of chlorine into TCTFE, making it easy to pump out the contents of the reactor. It has been found that an HLA derived from methane is not as easily freed from the CPVC formed as is an HLA derived from ethane. However, where freeing the HLA from the CPVC is not important, or where it may be desirable to have a significant concentration of the HLA remain with the CPVC, as for example where a cake of CPVC solids is converted to a CPVC foam, the methane derivatives, and in particular, DCDFM, may be preferred.

When TCTFE (commercially available as Freon-113) is used, it is found that liquid TCTFE may be added to the contents of the preferably pressurized reactor, while stirring, causing $Cl_2$ to dissolve in the TCTFE and precipitating solid finely divided CPVC. The temperature of the TCTFE prior to its addition to the syrup is not critical but it is preferred that it be no higher than about 50° even under pressurized conditions. It will be evident to one skilled in the art that, if desired, cold liquid DCDFM may be added to the syrup, or a gaseous HLA may be condensed into the syrup if the syrup is cold enough. The choice of optimum temperature at which the components CPVC, liquid $Cl_2$ and HLA form a three-component mixture in the reactor will be determined by the selection of the HLA and the economics of an energy balance.

Referring again to FIG. 1, after the CPVC is precipitated, dump valve 20 is opened and the three component mixture of HLA, liquid $Cl_2$ and solid CPVC is discharged into a suitable filter means such as a rotary filter 21, or alternatively to a centrifuge, to recover the CPVC as a filter cake of discrete finely divided solids. The filtrate is a solution of TCTFE and liquid $Cl_2$ which filtrate is pumped by a filtrate pump 22 to a recovery system for separating and recovering TCTFE and liquid $Cl_2$.

A preferred recovery system takes advantage of the considerable spread between the boiling points of TCTFE and liquid $Cl_2$ which allows $Cl_2$ to be easily stripped from the TCTFE in a $Cl_2$ stripper 30 provided with a suitable reboiler (not shown). Where DCDFM (Freon-12) is used, the $Cl_2$ may be recovered by simple distillation under pressure. The separation effected in either case is excellent since no azeotrope is formed between chlorine and either DCDFM or TCTFE under desirable operating conditions. Overhead vapors of $Cl_2$ from the stripper are condensed in a heat exchanger 31 through which a cryogen from the refrigeration system R is circulated. Condensed liquid $Cl_2$ is held in a second cylinder 32 from which it may be returned by pump 33 to the reactor 10. The TCTFE is withdrawn as stripper bottoms and is held in an accumulator 34 from which it is returned by pump 35 to the reactor for reuse in the process.

It is not critical how much TCTFE is added to the syrup in the reactor provided enough is added to precipitate essentially all the CPVC. the contents of the reactor are pumped to a suitable filter means or centrifuge to recover the CPVC. The spread of the boiling points between chlorine and TCTFE, and their relative volatility, allows chlorine to be easily stripped from the TCTFE. Where DCDFM (Freon-12) is used, the $Cl_2$ may be recovered by simple distillation. The separation effected in either case is excellent since, under preferred operating conditions, no azeotrope is formed between chlorine and either TCTFE or DCDFM. The $Cl_2$ and HLA are each recovered and each reused.

It is important that the HLA chosen as a solvent for liquid $Cl_2$ be added to the syrup-like solution of CPVC in $Cl_2$, or the morphology of the solid CPVC precipitated will not be the same. That is, the morphology of solid CPVC recovered by adding the HLA to the syrup will be different from the morphology of the solid CPVC recovered by adding the syrup to the HLA. The morphology of the solid CPVC affects its processability, and depending upon the processing requirements and properties sought in the finished article, the order of addition of syrup to solvent, or vice versa, is highly important.

Figure 2:
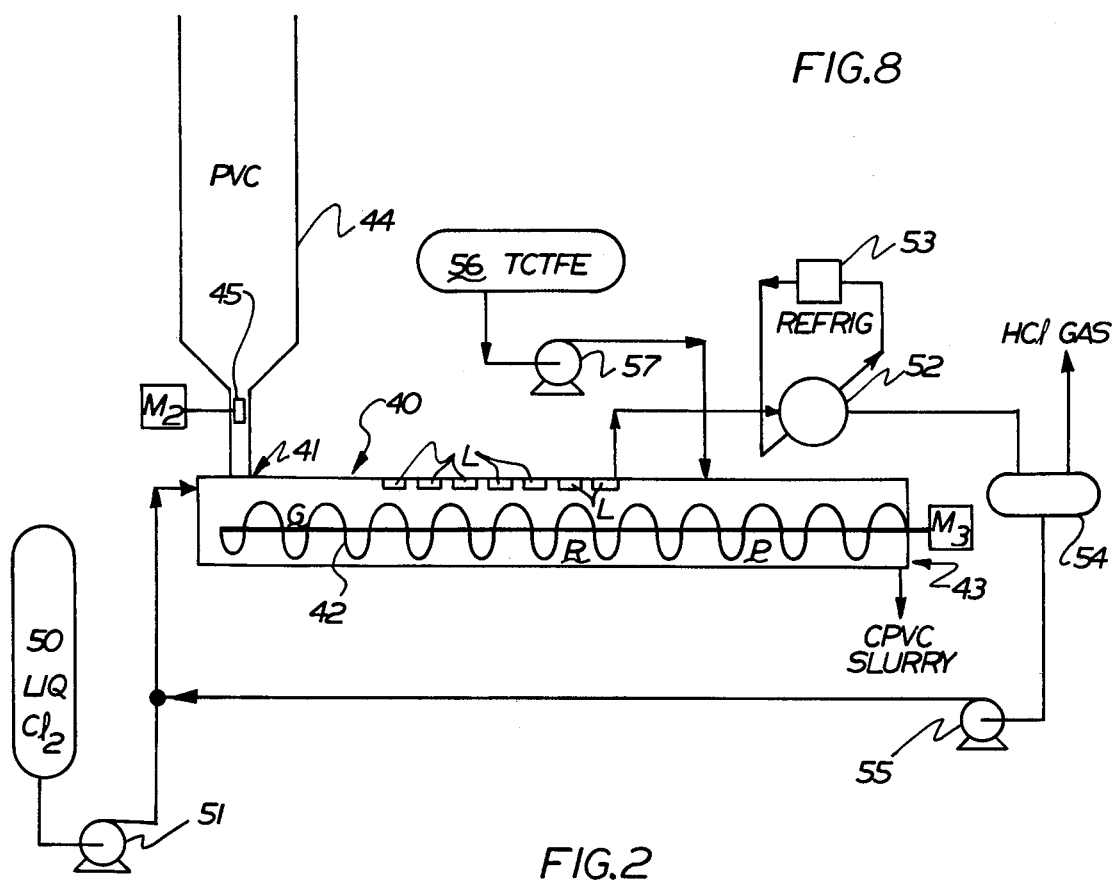
FIG. 2 is a flowsheet which schematically illustrates the principal features of a continuous process for the "high liquid chlorination" of PVC macrogranules in a slurry having a large excess of liquid chlorine.

Referring now to FIG. 2, there is shown a flowsheet schematically illustrating a continuous process of this invention. The PVC feed to be chlorinated enters at the inlet end 41 of a very long horizontal, jacketed reactor 40 which is equipped with a longitudinally axial helical agitator (referred to as a "votator") 42 with flights designed to lift macrogranules of PVC feed from near the bottom surface of the reactor to near the top, and to move any solids deposited near the bottom of the reactor towards its discharge end 43. In operation, the reactor may be viewed as having three zones, namely, a gel phase zone "G" near the inlet end, a reaction zone "R" in the mid-section, and a precipitation zone "P" near the discharge end.

The PVC feed is continuously flowed into the reactor from a PVC storage bin 44, by being metered through a vaned metering device 45 driven by an electric motor $M_2$. The votator 42 is driven by an electric motor $M_3$ at a speed sufficient to churn the macrogranules soaking them in liquid $Cl_2$ held in the reactor, and thoroughly wetting their surfaces so as to form a gel phase on and within the macrogranules. The liquid $Cl_2$ is maintained at about 0° C. in a storage tank 50 from which it is pumped by pump 51 to the reactor. The macrogranules of PVC are moved longitudinally slowly towards the reaction zone to afford sufficient time for the macrogranules to form the gel phase.

In the reaction zone there is provided above the votator 42 a bank of ultraviolet lights identified as "L", which illuminate the PVC macrogranules and the gel phase PVC thereof while they are suspended in the liquid $Cl_2$, thus stimulating chlorination of the PVC to convert it to CPVC. As the chlorination reaction progresses, HCl gas is evolved, and because the reaction is exothermic, sufficient heat may be generated to evaporate some liquid Cl$_2$ from the reaction mass. Such evaporation of Cl$_2$ may help stabilize the reaction zone. The amount of Cl$_2$ evaporated may be controlled by maintaining a sufficiently low temperature in the reaction zone.

Byproduct HCl gas, and chlorine vapors are removed from the reaction zone and flowed to a heat exchanger 52 through which a low temperature coolant "cryogen", provided by refrigeration system 53, is circulated. The Cl$_2$ is condensed, and the HCl is recovered as gas 10 which is used in another process.

Sufficient cold TCTFE from storage tank 56 is pumped with pump 57 to the precipitation zone P to precipitate essentially all the CPVC which is gradually moved towards the discharge end 43 and removed as a slurry. In a manner analogous to that described in FIG. 1 hereinbefore, the slurry is filtered, the solid CPVC is recovered, and the TCTFE and liquid Cl$_2$ separated and returned to the reactor for further use, the details of which are not shown in FIG. 2, and need not be repeated here.

Figure 3:
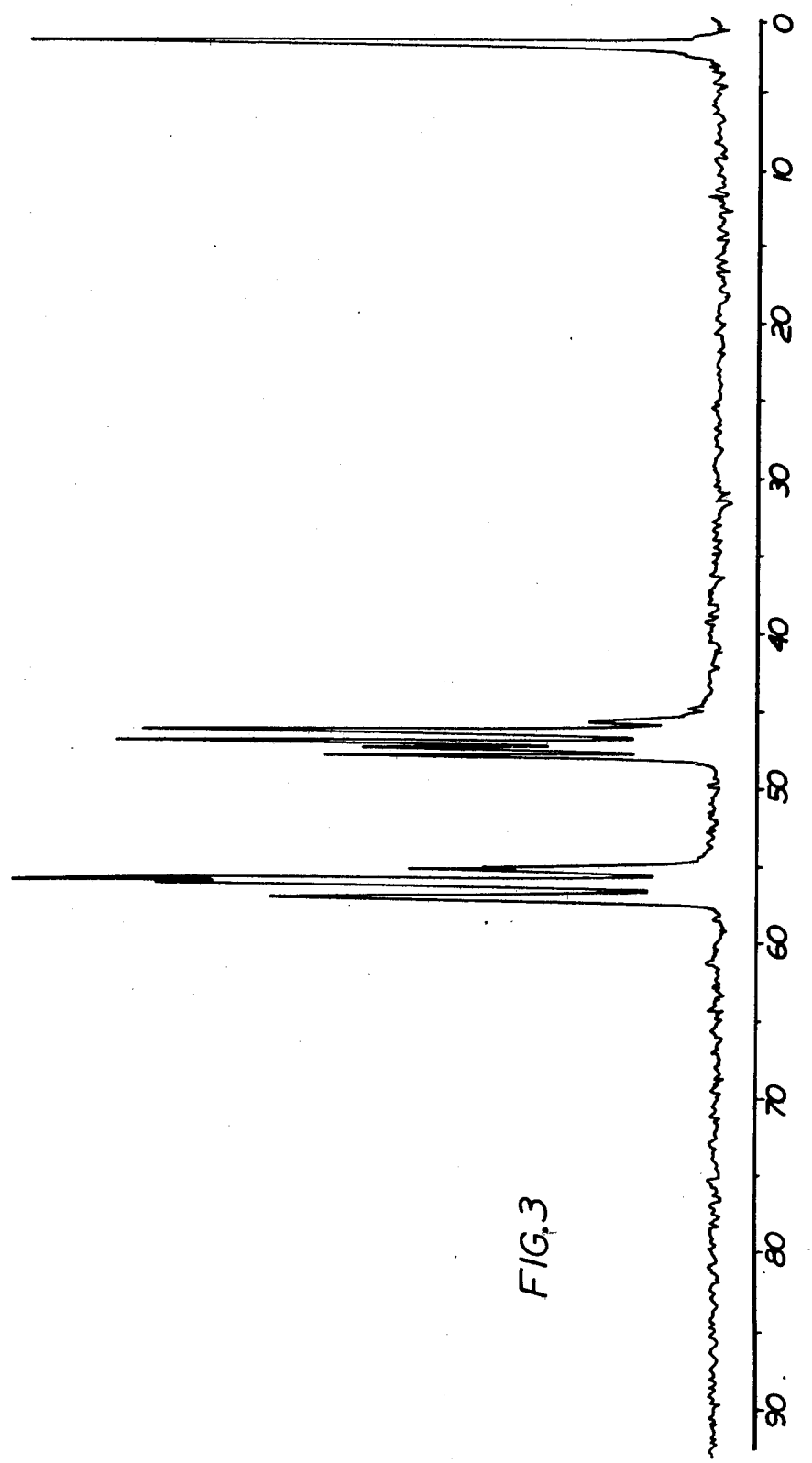
FIG. 3 is a trace of a Cnmr spectra of *Geon® 103EP PVC having a Cl content of about 56.7% by wt such as is typically obtained by suspension polymerization of vinyl chloride.

Measurement of the glass transition temperature ($T_g$) at a particular chlorine level (%Cl) of the CPVC, an analysis of its $^{13}$C nmr spectra, and evaluation of the results measured with a differential scanning calorimeter (DSC) indicate that homogeneous CPVC has a lower heat of melting corroborating its essentially noncrystalline nature. Referring now to the $^{13}$C nmr spectra shown in FIGS. 3–7, which spectra were obtained with a Bruker Model No. WH-200 spectrometer operating at 50.28 MHz, and particularly first to FIG. 3, there is shown the spectra for PVC obtained by polymerization of vinyl chloride in an aqueous suspension which results in a PVC having 56.7% Cl. It is seen that the peaks corresponding to the CH$_2$ group are in the 45–48 ppm range relative to tetramethylsilane (0 ppm), and the peaks corresponding to the CHCl group are in the 55–58 ppm range (for additional details see the Carman article, supra).

The $T_g$ of the PVC is 91° C. as determined by the following method: A sample of about 10–15 mg is placed in the pan of Perkin Elmer DSC-2 and heated at the rate of 40° C./min. The $T_g$ is computed from the midpoint of the transition curve generated in the second heating of the sample. The sharp $T_g$ obtained is characteristic of well-defined oft-repeated sequences characteristic of PVC.

Figure 4:
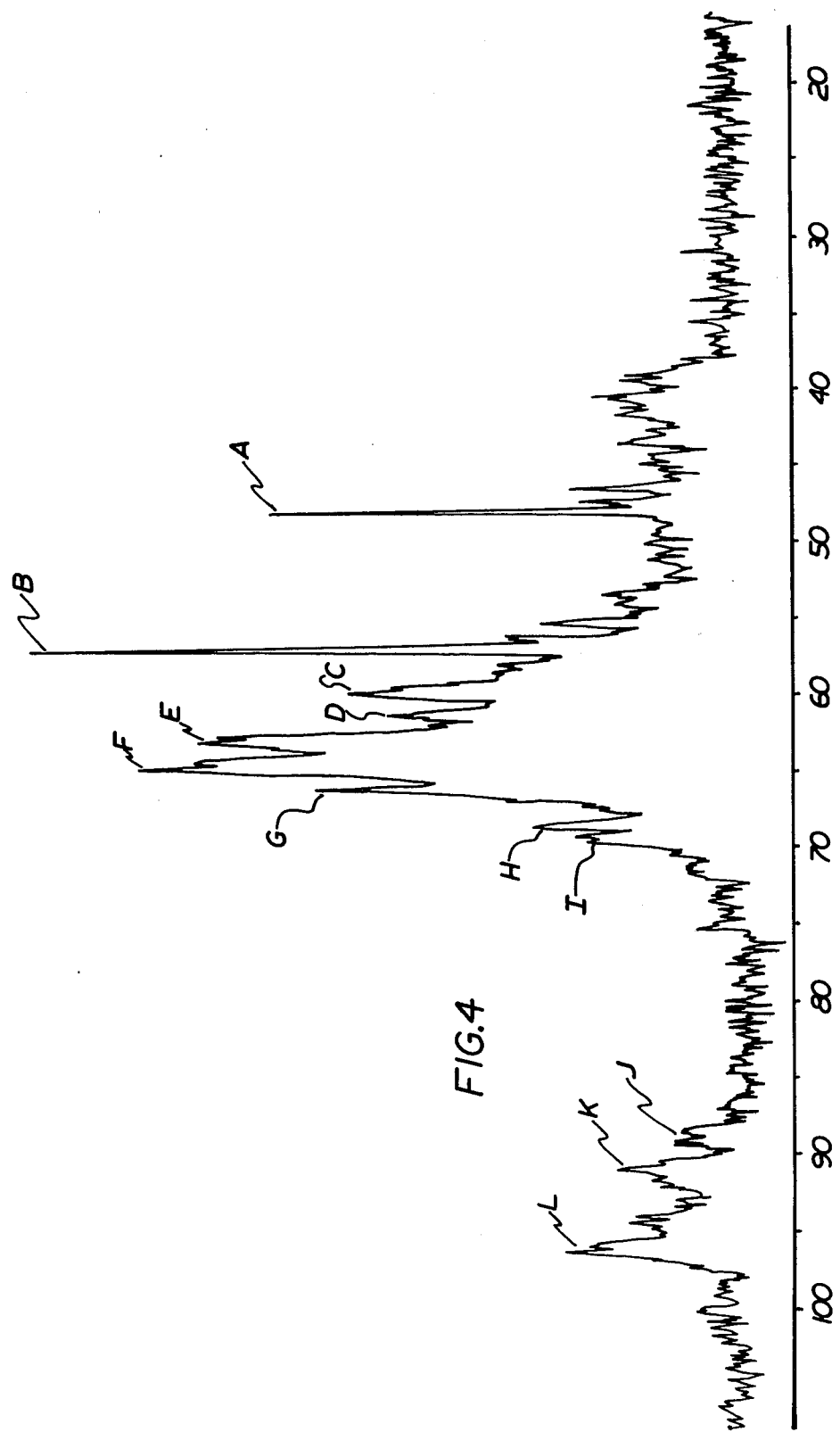
FIG. 4 is a Cnmr spectra of CPVC obtained by suspension chlorination in water of PVC having a Cl content of 56.7%. The Cl content of the CPVC is 71.2% by wt.

After this PVC is chlorinated to 71.2% Cl in aqueous suspension as described in the '489 patent to Dannis et al, its $T_g$ is sufficiently broad to be indeterminate, indicating a large mix of sequences which undergo the glass transition phenomenon incrementally over a wide range of temperature. Referring to the CPVC spectra shown in FIG. 4, there is seen a peak identified by reference symbol A which corresponds to a CH$_2$-centered tetrad indicating the presence of syndiotactic sequences as in PVC evidenced in FIG. 3. Another peak identified by reference symbol B in FIG. 4 is also the same as that evidenced in PVC and corresponds to the CHCl-centered syndiotactic triad. The cluster of peaks C, D, E, F, G, H and I in the range from about 60–70 ppm are characteristic of a CPVC produced in aqueous suspension. An analogous cluster of peaks in this range of 60–70 ppm is found in any CPVC produced in aqueous suspension irrespective of how the PVC was derived. Other clusters of peaks in this range are also found in CPVC produced by fluid-bed chlorination with gaseous chlorine and with CPVC produced by my low liquid chlorination process disclosed in Ser. No. 177,969, filed Aug. 14, 1980.

Referring further to FIG. 4 there are also shown a cluster of peaks J, K and L in the range from about 87–97 ppm, and it is seen that the area under each of the peaks is progressively greater than that under the preceding one, the area under peak L being the greatest.

Figure 5:
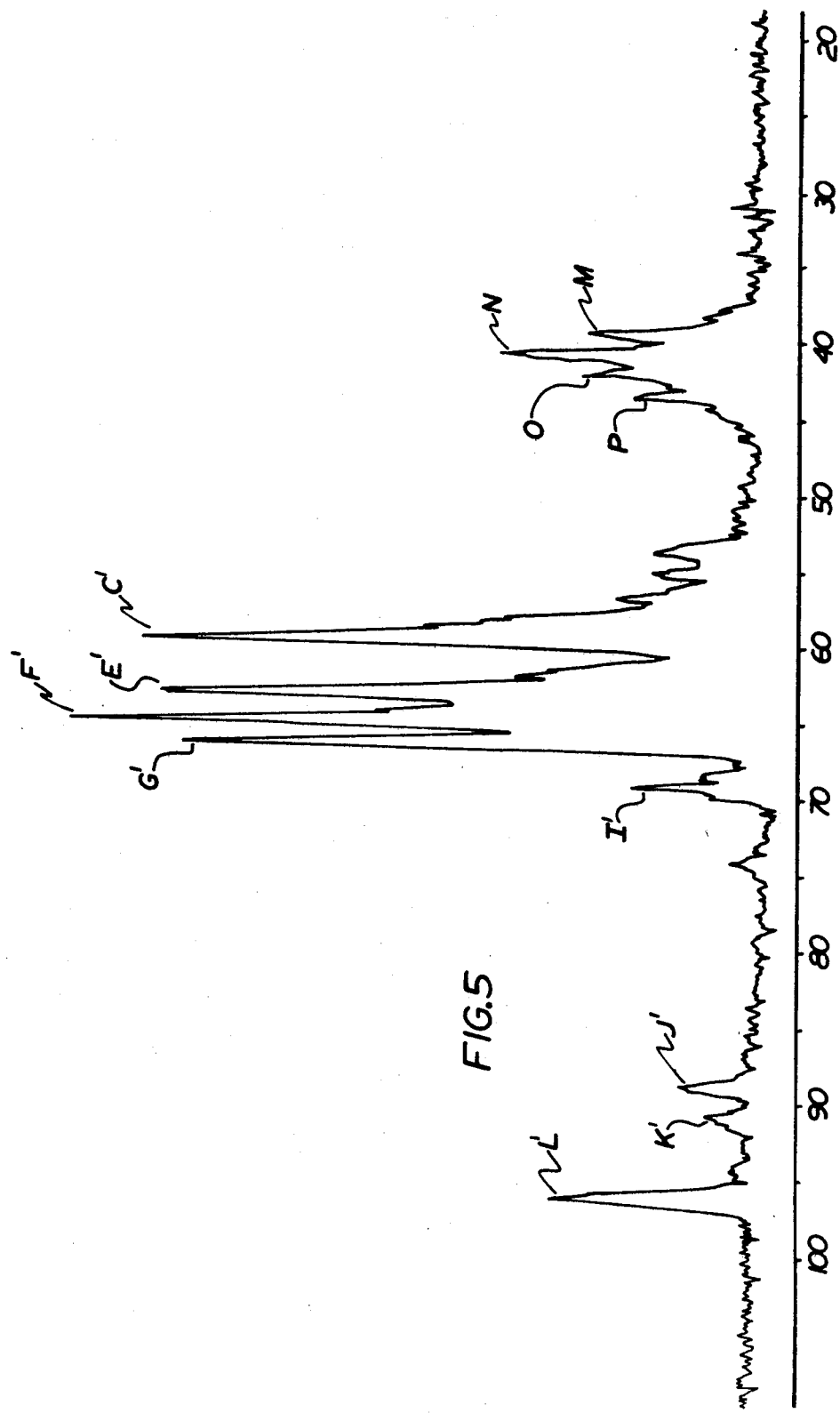
FIG. 5 is a Cnmr spectra of CPVC obtained by the high liquid chlorination process of this invention. The Cl content of the CPVC is 69.8% by wt. The PVC starting material is the same as that used in the aqueous suspension chlorination of PVC.

Referring now to FIG. 5 there is shown a representative spectra of the novel CPVC obtained by the high liquid chlorination process of this invention. The $T_g$ is 184° C. and not indeterminate indicating similar sequences having a well-defined $T_g$. The chlorine content is 69.8% Cl which is substantially the same as that of the CPVC obtained by chlorination in aqueous suspension, no differences in structure being attributable to the slight difference in Cl content. A comparison of FIG. 5 with FIG. 4 shows no peak corresponding to peak A in FIG. 4 which indicates that no syndiotactic sequences are present in an amount sufficient to be detected. The cluster of peaks C-I in FIG. 4 are replaced with sharply defined peaks C', E', F', G' and I' in FIG. 5. Referring particularly to peaks J', K' and L' it is noted that the peaks are sharper and better defined than peaks J, K and L as is especially apparent with peaks J and L. Further, the combined areas under peaks J, K and L are clearly greater than the combined areas under J', K' and L' indicating that CPVC which gave the spectra in FIG. 5 is more homogeneously chlorinated than that which gave the spectra in FIG. 4.

It is further to be noted that FIG. 4 shows, in the range from about 37–45 ppm, a broad group of peaks which indicate a broad nmr absorption corresponding to CH$_2$ groups. This absorption is so broad that it fails to provide significant structural information about the CPVC. In comparison, the peaks M, N, O and P in FIG. 5 indicate the presence of at least four (4) different structural sequences containing CH$_2$ groups each of which is well-defined, indicating the homogeneity of the CPVC.

Figure 6:
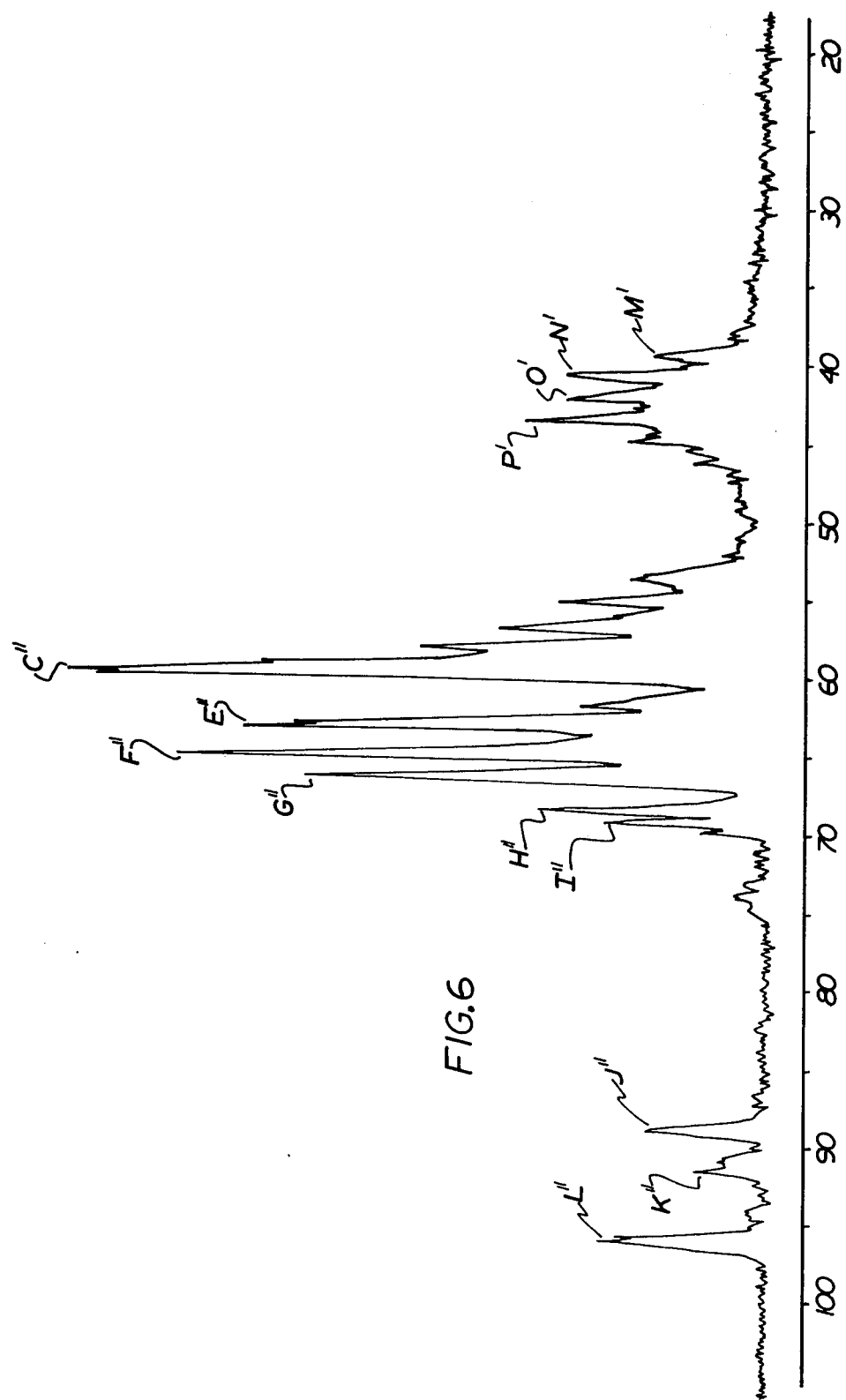
FIG. 6 is a Cnmr spectra of CPVC obtained by solution chlorination of the aforementioned PVC. The Cl content of the solution chlorinated CPVC is 68.3% by wt.

Referring now to FIG. 6 there is shown a representative spectrum of a CPVC containing 68.3% Cl obtained by solution chlorination of PVC. As one would expect a solution chlorinated PVC to be homogeneously chlorinated, this spectrum (FIG. 6) is representative of a homogeneously chlorinated CPVC. In FIG. 6, the peaks M', N', O', and P' appear in the 37–45 ppm range and correspond to the peaks M, N, O and P in the same range in FIG. 5. However, specifically with respect to peaks N and N'; O and O'; and, P and P', a comparison indicates that in FIG. 6 peaks N' and O' are substantially equivalent but P' is clearly greater than either. In FIG. 5, P is the smallest of the four peaks, N being the greatest.

Referring now to the peaks in the range from about 57–70 ppm in FIGS. 5 and 6, C" is the greatest peak in FIG. 6, clearly greater than F". In FIG. 5, F' is the greatest peak, clearly greater than F'.

Referring now to FIGS. 4, 5 and 6 for a comparison thereof with respect to peaks in the 57–70 ppm range, it is observed that H for aqueous chlorinated CPVC (FIG. 4) and H" for solution chlorinated CPVC (FIG. 6) appear at the initial stages of chlorination but does not appear for high liquid chlorinated CPVC (FIG. 5). Apparently the sequences which gave rise to a peak H' (not now visible in the spectra) are chlorinatable while the sequences which gave rise to peaks H and H" are not.

EXAMPLES

In a typical pilot plant run, 400 parts by wt of macrogranules of Geon® 103EPF76 poly(vinyl chloride) resin, a general purpose resin, are charged to the jacketed reactor fitted with a helical paddle stirrer, and a bank of ultraviolet lights some or all of which may be turned on, as desired. Liquid cryogen, such as a chilled brine solution, is circulated through the jacket of the reactor so as to keep chlorine in the liquid state at the pressure and temperature at which the chlorination reaction is to be carried out. After charging the reactor with PVC the reactor and its contents are subjected to vacuum, or flushed with an inert gas, preferably nitrogen. Thereafter, liquid chlorine is sprayed into the reactor while the macrogranules of PVC are being slowly churned by the paddle stirrer, until 4000 parts of liquid $Cl_2$ are charged.

The PVC macrogranules form a slurry which is easily agitated by the paddle stirrer in the reactor. After a short period of about 30 mins or less, which is not critical, it is found that most of the macrogranules have swollen. In this swollen condition they are ready for photochlorination which is effected by turning on the bank of ultraviolet lights. The lights are left on for as long as is required to produce the desired Cl content in the CPVC, this time being arrived at by trial and error for the particular temperature and pressure conditions of the reactor. The period of irradiation is in the range from about 4 to about 9 hours depending upon the particular physical characteristics of the PVC, and the intensity of the lights. A more preferred time for irradiation is in the range from about 5 to about 6 hours. While the slurry of PVC in liquid $Cl_2$ is being irradiated, it is continuously slowly stirred to facilitate evolution of HCl and $Cl_2$ from the reaction mass, and to permit more uniform chlorination of the PVC. For economic reasons the preferred temperature of operation is in the range from about 0° C. to about 35° C., and the chlorine evolved is condensed and returned to the reactor for another run; the HCl evolved is recovered for use in another reaction.

At the end of the reaction, a thick syrupy solution of CPVC in liquid $Cl_2$ ("syrup") is obtained which is thinned with five times as much TCTFE as there is syrupy solution in the reactor, the TCTFE being precooled below temperature, preferably in the range from about 0° C. to about 10° C. After substantially all the CPVC is precipitated from solution, the contents of the reactor are discharged to a rotary filter from which solid CPVC is removed and dried to rid it of the TCTFE-liquid $Cl_2$ solution which wets the cake. About 515 parts dry finely divided solid CPVC in the size range from 325 mesh and smaller, to 6 mesh and larger, U.S. Standard, are recovered indicating that essentially all the PVC has been converted.

The surface area of the PVC starting material in Table I, measured by the BET method, is in the range from about 1.25 to about 1.75 $m^2/g$, and the surface area of the CPVC obtained is generally less, the decrease in surface area being characteristically in the range from about 20 to about 50%, depending upon the particular process conditions for chlorination and the method of recovery of the CPVC formed. The results obtained by chlorination in an analogous manner as above, are tabulated in Table I hereinbelow:

TABLE I

| | | | Chlorination of PVC in liquid $Cl_2$ | | | | | | |
|---|---|---|---|---|---|---|---|---|---|
| PVC resin identified | Surface area of PVC $m^2/g$ | PVC resin charged g. | Liquid $Cl_2$ charged g. | Ratio Cl/PVC | ultraviolet light used | chl'n't'n time mins. | % $Cl_2$ in CPVC | $T_g$ °C. | TGA+ 10% wt. loss, at °C. |
| 103EPF76** | 1.69 | 100 | 500 | 5. | PenRay | 300 | 66.9 | 145 | 307 |
| 103EPF76 | 1.69 | 100 | 600 | 6. | 300 w | 360 | 66. | 131 | 310 |
| 103EPF76 | 1.69 | 100 | 1000 | 10 | 300 w | 360 | 65.5 | 130 | 308 |
| Geon* 92 | 1.14 | 100 | 1000 | 10 | 300 w | 300 | 65.9 | 141 | 304 |
| 103EPF76 | 1.69 | 50 | 500 | 10 | 60 w | 190 | 71.6 | 182 | |
| 103EP** | 1.78 | 25 | 375 | 15 | 300 w | 180 | 69.9 | 187 | |
| 103EP | 1.78 | 25 | 500 | 20 | PenRay | 360 | 70.5 | 194 | 340 |

Figure 12:
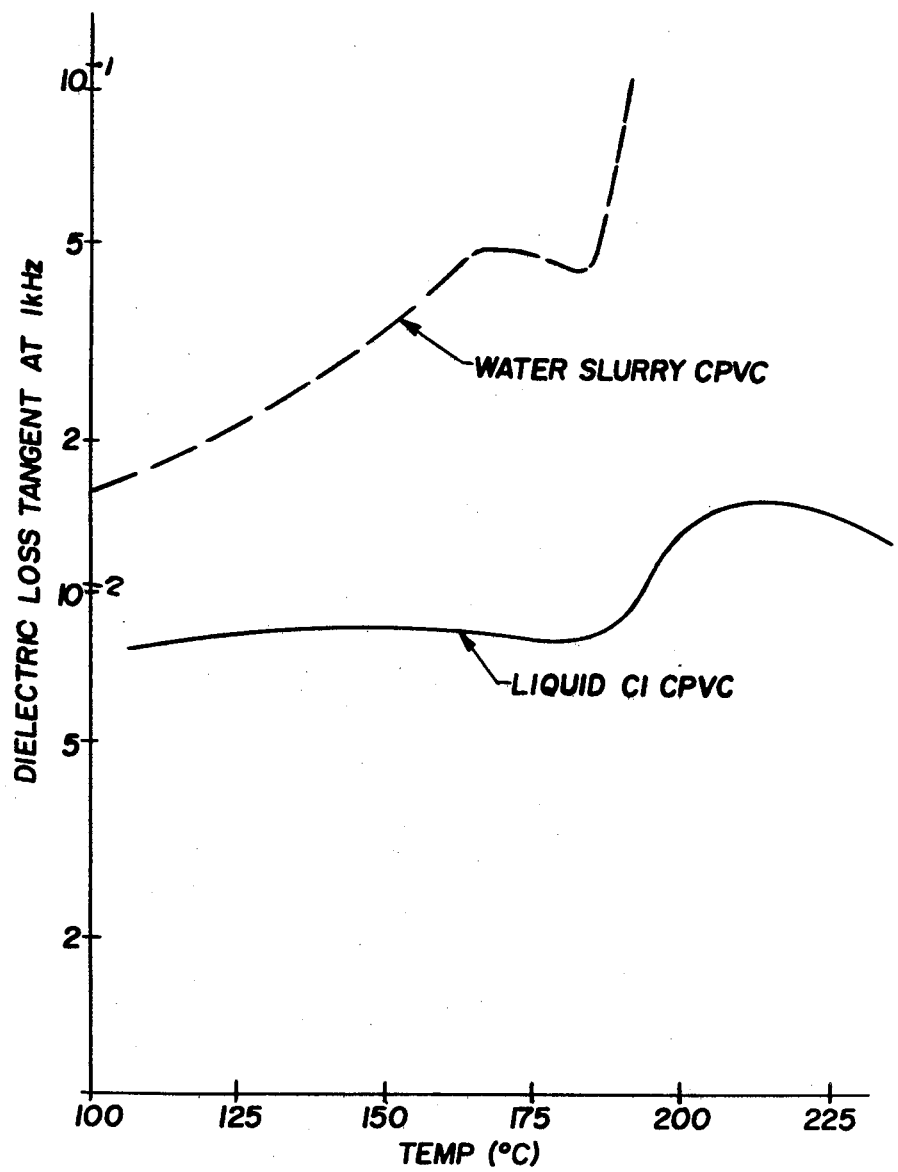
FIG. 12 is a plot of the dielectric loss tangent at 1 kHz measured at various temperatures, for CPVC formed by chlorination in an aqueous slurry (referred to as "water-slurry CPVC"), and for CPVC formed by the process of this invention (referred to as "liquid Cl CPVC").

+under nitrogen
**code for Geon* brand PVC resins manufactured and sold by the B. F. Goodrich Company
*Geon is a Trademark of the B. F. Goodrich Company The water chlorination process as described in U.S. Pat. No. 2,996,489 is known to produce a heterogeneous (two solid phases) CPVC. This heterogeneous characteristic of any CPVC produced by chlorination in an aqueous slurry is confirmed by many techniques, among which are measurements for dielectric constant, and loss tangent, made with an auto-balancing dielectric bridge. The results of dielectric loss tangent are plotted in FIG. 12 for water slurry CPVC (upper curve) and liquid Cl CPVC (lower curve).

The characteristic presence of two phases in water slurry CPVC is evidenced by the shoulder at about 165° C., which is the first $T_g$, followed by a short fall-off, and steep rise at 190° C. which is the onset of the second $T_g$.

In contrast, the lower curve for liquid Cl CPVC (so labeled) shows the presence of but one phase, indicated by the single dielectric loss tangent peak which is clearly determinable and characteristic of the glass transition temperature.

Liquid Cl CPVC is uniquely characterized at 70.5% Cl by a dielectric loss tangent at 1 kHz which is less than 0.009 in the range from 110°–190° C.

Figure 13:
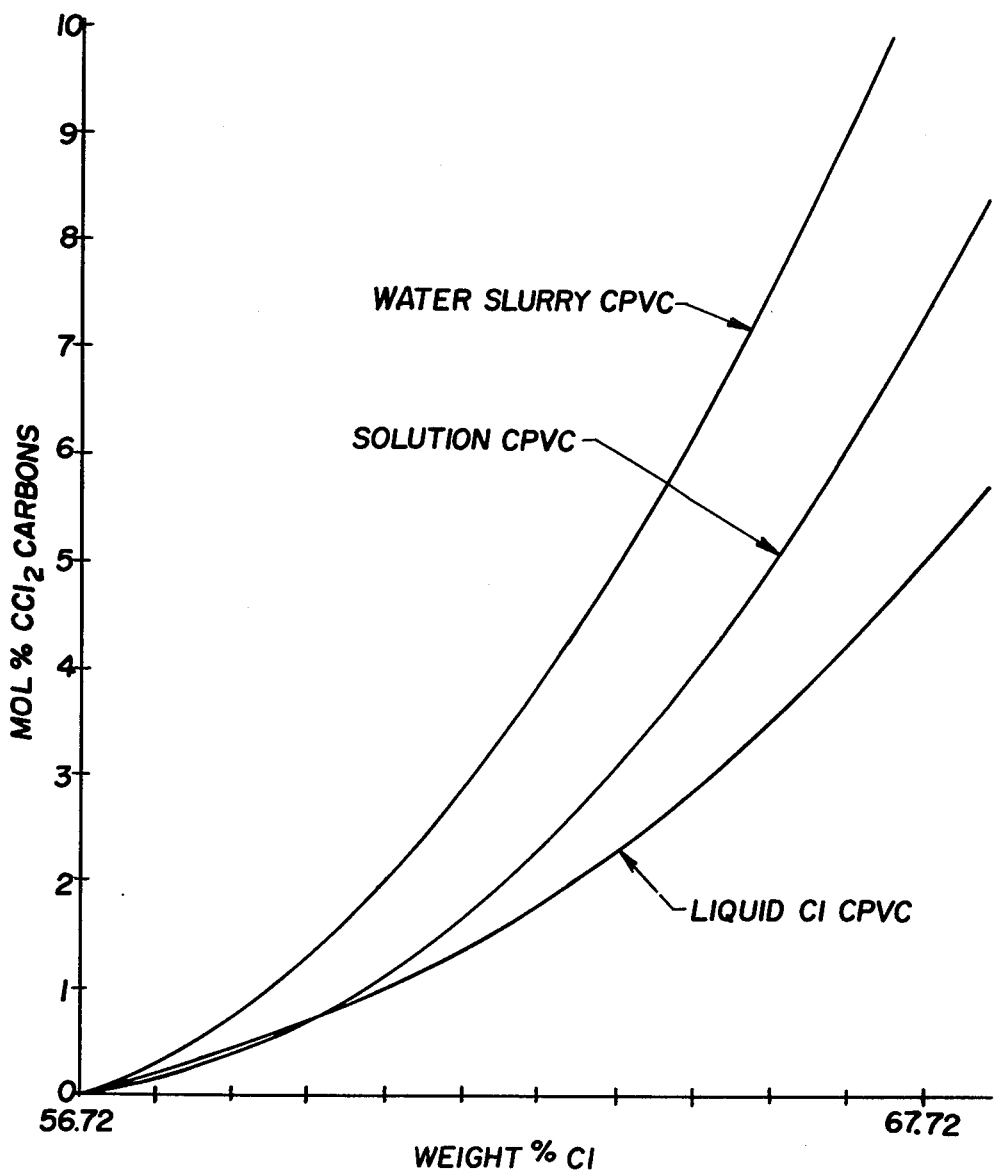
FIG. 13 is a plot of Mol percent $CCl_2$ carbons, as identified by $^{13}$Cnmr spectra, against the Weight percent Cl for each of three CPVCs, one formed by solution chlorination (referred to as "solution CPVC"), the others being for water-slurry CPVC, and liquid Cl CPVC.

Referring to FIG. 13, there are shown three separately identified curves, each being a plot of the mol % carbon atoms to which two (2) Cl atoms are attached (referred to as mol % $CCl_2$ carbons), against the weight percent Cl in the CPVC. By knowing the spin-lattice relaxation time, and nuclear Overhauser enhancement, the $^{13}C$ nmr spectra for $CCl_2$ carbons gives the numerical value proportional to the mol percent $CCl_2$ carbons.

Liquid Cl CPVC is distinctly characterized by the following: At 65% Cl, CPVC having a $T_g=130°$ C. has about 3.0 mol % $CCl_2$ carbons. At 68% Cl, CPVC having a $T_g=157°$ C. has about 6.0 mol % $CCl_2$ carbons. At 70.5% Cl, CPVC having a $T_g=194°$ C. has about 13.1 mol % $CCl_2$ carbons.

It will be seen that at the same wt % Cl content, water slurry CPVC, and solution CPVC each have higher mol % $CCl_2$ carbons than liquid Cl CPVC. Comparing the water slurry CPVC, in particular, it will be seen that at 65% Cl, and 68% Cl, the mol % CCl$_2$ carbons are 5.5%, and greater than 10% respectively. At 70.5% Cl, the mol % CCl$_2$ carbons for water slurry CPVC has not been determined. Quite clearly, liquid Cl CPVC is uniquely characterized in that, at above about 62% Cl content, it has lower mol % CCl$_2$ carbons than either water slurry CPVC or solution CPVC, at the same wt % Cl. The mol % CCl$_2$ carbons for water slurry CPVC is about twice as great compared with liquid Cl CPVC at the same wt % Cl.

From the foregoing curves in FIG. 13 it will be evident that the mol % CCl$_2$ carbons for a liquid Cl CPVC is always less than the mol % CCl$_2$ carbons for either water slurry CPVC or solution CPVC when all the CPVCs have a Cl content about 62% by wt.

A similar determination made by $^{13}$C nmr measurements of the mol % CHCl carbons for liquid Cl CPVC, water slurry CPVC and solution CPVC, shows that the mol % CHCl carbons for liquid Cl CPVC is greater than that for either water slurry CPVC or solution CPVC when all CPVCs have a Cl content greater than 62% by wt.

The unique nature of liquid Cl CPVC can also be recognized by the thermal characteristics of the polymer. For example, thermal analysis was done using a Perkin Elmer Differential Scanning Calorimeter (DSC-2). A first heat scan at 300 K. to 510–520 K. at 40 K./min, was followed by cooling at the same rate. It was then followed by a second heat scan under the same conditions as the first, but the sample was cooled quickly (at 320 K./min) after the run, to minimize decomposition.

The $T_g$ is the midpoint of the tangent intersecting with lower and upper baselines.

The second heat of melting $\Delta Hm_2$ was calculated from the melting peak area after calibration of a cell using pure indium standard.

Referring to FIG. 14 it is seen that:

At 65% Cl having a $T_g=130°$ C., $\Delta Hm_2=$ about 0.0–0.25 kJ/Kg for liquid Cl CPVC, but is higher (about 1.0 kJ/Kg) for water slurry CPVC. The second heats of melting for solution CPVC are uniformly lower than those for liquid Cl CPVC, as is evident from the curve labeled "liquid Cl CPVC".

I claim:

1. Solid chlorinated poly(vinyl chloride) ("CPVC") resin having
   (i) a chlorine content greater than 65 percent by weight,
   (ii) a determinable glass transition temperature,
   (iii) in a $^{13}$C nuclear magnetic resonance spectrum of said CPVC, a first peak at about 41 ppm said first peak being greater than other peaks in the range from about 37 to about 45 ppm, and
   (iv) a second peak at about 63 ppm, said second peak being greater than other peaks in the range from about 57–70 ppm.

2. The solid chlorinated poly(vinyl chloride) resin of claim 1 wherein said chlorine content is at least 70 percent by weight, and said spectrum has no detectable syndiotactic peak in the range from about 45–50 ppm.

3. Solid chlorinated poly(vinyl chloride) resin having
   (i) a chlorine content greater than 65 percent by weight,
   (ii) a single solid phase having a determinable $T_g$ and a dielectric loss tangent at 1 kHz which is always less than $1.5\times10^{-2}$ in the temperature range from about 100° C. to about 225° C. when the Cl content is 70.5% by wt.

4. The solid chlorinated poly(vinyl chloride) resin of claim 3 additionally characterized by the following:
   at 65% Cl, having a $T_g=130°$ C. and about 3.0 mol % CCl$_2$ carbons; at 68% Cl, having a $T_g=157°$ C. and about 6.0 mol % CCl$_2$ carbons; and, at 70.5% Cl, having a $T_g=194°$ C. and about 13.1 mol % CCl$_2$ carbons.

5. The solid chlorinated poly(vinyl chloride) resin of claim 3 which resin at 65% Cl having a $T_g=130°$ C., has a second heat of melting $\Delta Hm_2$ in the range from 0.0–0.25 kJ/Kg.

6. In a process for photochlorinating poly(vinyl chloride) homopolymer macrogranules to obtain homogeneously chlorinated 'chlorinated poly(vinyl chloride) resin' ("CPVC") including
   suspending said homopolymer having a chlorine content in the range from about 56% to 57% by weight, in liquid chlorine present in an amount at least five times the weight of said homopolymer, for a period of time sufficient to absorb said liquid chlorine into said macrogranules,
   swelling said macrogranules at solid-liquid interfaces within and around said macrogranules to produce a gel phase by the action of said liquid chlorine,
   photo-illuminating said gel phase until said homopolymer is converted to homogeneously chlorinated CPVC having at least 65% by weight of chlorine, and the mol ratio of PVC present in a sequence of 3 or more vinyl chloride units, to the mols of total vinyl chloride units, is always less than 3.0,
   obtaining a solution of said homogeneously chlorinated CPVC in liquid chlorine, and
   recovering solid homogeneously chlorinated CPVC from said solution, the improvement comprising,
   (a) adding a halogenated lower alkane to said solution in an amount sufficient to dissolve said liquid chlorine, so as to
   (b) precipitate said solid homogeneously chlorinated CPVC, and,
   (c) separating said solid homogeneously chlorinated CPVC from said liquid chlorine and halogenated lower alkane.

7. The process of claim 6 wherein recovering said solid homogeneously chlorinated CPVC from solution comprises,
   (a) adding a sufficient amount of a halogenated lower alkane to said solution to precipitate substantially all said homogeneously chlorinated CPVC as solid, and,
   (b) separating precipitated solid from said halogenated lower alkane and liquid chlorine.

8. The process of claim 7 wherein said halogenated lower alkane is selected from the group consisting of dichlorodifluoromethane and trichlorotrifluoroethane.

* * * * *